US007543485B2

(12) United States Patent
Chemello

(10) Patent No.: US 7,543,485 B2
(45) Date of Patent: Jun. 9, 2009

(54) ONBOARD FUEL INJECTOR TEST

(75) Inventor: Morgan Chemello, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 143 days.

(21) Appl. No.: 11/811,946

(22) Filed: Jun. 12, 2007

(65) Prior Publication Data

US 2008/0307870 A1 Dec. 18, 2008

(51) Int. Cl.
*G01M 15/04* (2006.01)

(52) U.S. Cl. .................................................. 73/114.51

(58) Field of Classification Search ............. 73/114.45, 73/114.48, 114.49, 114.51

See application file for complete search history.

(56) References Cited

U.S. PATENT DOCUMENTS 5,708,202 A * 1/1998 Augustin et al. ......... 73/114.43
7,197,918 B2 * 4/2007 Shen ....................... 73/114.51
2004/0025846 A1 * 2/2004 Draper et al. ............... 123/447
2006/0144367 A1 * 7/2006 Futonagane et al. ......... 123/446
2008/0103676 A1 * 5/2008 Ancimer et al. ............. 701/103

* cited by examiner

*Primary Examiner*—Eric S McCall

(57) ABSTRACT

A method of testdiagnosing the operation of each of a plurality of fuel injectors of an internal combustion engine system includes inhibiting ignition of the engine, monitoring a fuel pressure within a fuel rail of the engine and pulsing a fuel injector of the plurality of fuel injectors of the engine. Whether the fuel pressure has stabilized is determined and a pressure differential is calculated based on a pre-pulse fuel pressure and a post-pulse fuel pressure when the fuel pressure has stabilized. A technician determines whether the fuel injector is operating properly based on the pressure differential.

21 Claims, 5 Drawing Sheets

ONBOARD FUEL INJECTOR TEST

FIELD

The present disclosure relates to engine systems, and more particularly to a system and method for determining whether a fuel injector has a flow problem on a direct injection fuel system.

BACKGROUND

The statements in this section merely provide background information related to the present disclosure and may not constitute prior art.

Internal combustion engine systems include an engine that combusts a fuel and air mixture within cylinders to generate drive torque. More specifically, air is drawn into the engine through an intake and is distributed to the cylinders. The air is mixed with fuel and the air and fuel mixture is combusted. Some engines are so-called direct injection type engines, which include a fuel system that injects fuel directly into the cylinders. That is to say that the air is drawn into the cylinder and is mixed with fuel inside the cylinder itself. The fuel system typically includes a fuel rail that provides fuel to individual fuel injectors associated with the cylinders.

In some instances, the fuel system may not function properly due to damage, component wear, clogging and the like. One example of this is when a flow problem is suspected with an individual or multiple fuel injectors of the fuel system. Diagnostic systems have been developed to identify the source of an improperly functioning fuel system. Such traditional diagnostic systems are not adaptable to direct injection fuel systems due to differences in system design. Without a method to test the system, the technician can not readily pinpoint the problem to a particular component. In the case of fuel injectors, for example, a maintenance technician may replace an entire set of fuel injectors when a problem may only exist with a single fuel injector.

SUMMARY

Accordingly, the present disclosure provides a method of testing the operation of each of a plurality of fuel injectors of an internal combustion engine system. The method includes inhibiting ignition of the engine, monitoring a fuel pressure within a fuel rail of the engine and pulsing a fuel injector of the plurality of fuel injectors of the engine. Whether the fuel pressure has stabilized is determined and a pressure differential is calculated based on a pre-pulse fuel pressure and a post-pulse fuel pressure when the fuel pressure has stabilized. Whether the fuel injector is operating properly is determined based on the pressure differential.

In other features, the method further includes operating a fuel pump such that the fuel pressure achieves a threshold fuel pressure prior to the step of pulsing. The engine is cranked until the fuel pressure achieves the threshold fuel pressure. Operation of the fuel pump is discontinued when the engine speed is zero after having cranked the engine. The testing is aborted if the fuel pressure does not achieve the threshold fuel pressure within a threshold time period.

In still another feature, the method further includes identifying whether a fault condition of a component of the engine exists.

In yet another feature, the method further includes determining whether enable conditions are met.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
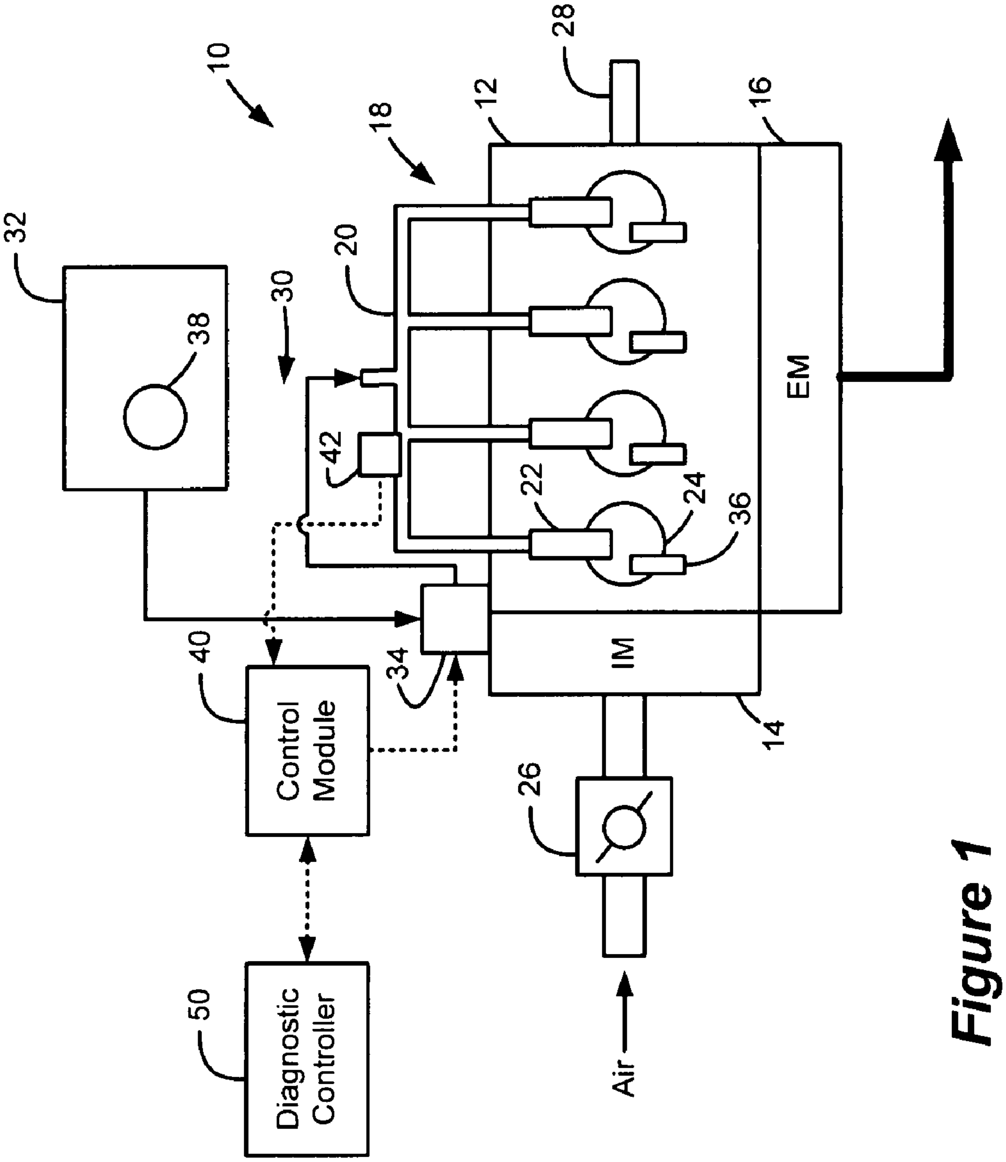
FIG. 1 is a functional block diagram of an exemplary engine system.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary engine system 10 is illustrated. The exemplary engine system 10 includes an engine 12 having an intake manifold 14 and an exhaust manifold 16. The engine system 10 further includes a fuel injection system 18 having a fuel rail 20 and a plurality of fuel injectors 22 associated with respective cylinders 24. The engine system 10 further includes a plurality of ignition components 36 associated with respective cylinders 24. The ignition components 36 include, but are not limited to, a spark plug, and ignition coil and/or an ignition wire. Air is drawn into the intake manifold 14 through a throttle 26 and is distributed to the cylinders 24. The air is mixed with fuel, which is injected using a respective fuel injector 22, to form a combustion mixture within a cylinder 24. The combustion mixture is provided at a desired air to fuel ratio, is ignited by the ignition system 36 and combusted within the cylinder to reciprocally drive a piston (not shown), which in turn drives a crankshaft 28. Exhaust gas is exhausted from the engine 12 through the exhaust manifold 16.

A fuel system 30 provides fuel to the injection system 18. More specifically, the fuel system 30 includes a fuel reservoir 32 and a fuel pump 38 and a high pressure fuel pump 34. The high pressure fuel pump 34 can be a fixed displacement pump or a variable displacement pump and provides pressurized fuel to the fuel rail 20. As the fuel injectors 22 inject fuel into the respective cylinders 24, the high pressure fuel pump 34 replenishes the pressurized fuel within the fuel rail 20. The high pressure fuel pump 34 can be mechanically driven by the engine 12. It is also anticipated, however, that the fuel injector test of the present disclosure can be adapted for use with engine systems having an electronically driven fuel pump.

A control module 40 regulates operation of the engine system 10 based on the fuel injector diagnostic control of the present disclosure. More specifically, a pressure sensor 42 monitors a fuel pressure within the fuel rail 20.

The present disclosure provides a fuel injector diagnostic control for determining whether the individual fuel injectors are functioning properly. The fuel injector diagnostic control can be executed by a vehicle technician. More specifically, the vehicle technician can connect a diagnostic controller 50 to the control module 40, wherein the technician is able to interface with the control module 40 via the diagnostic controller 50 to execute the fuel injector diagnostic control. In general, the fuel injector diagnostic control provides the service technician with a method for testing fuel injectors, which can pinpoint a problem with a single fuel injector and prevent the technician from having to replace the entire set. The fuel injector diagnostic control is automated making it much faster and more accurate than traditional, manual methods.

The fuel injector diagnostic control initially identifies whether any faults that are indicated would affect the test. For example, if there are any diagnostic trouble codes (DTCs) set that would prevent the diagnostic control from properly functioning (e.g., any DTCs for components used for executing the diagnostic control and/or for recording the data collected), the fuel injector diagnostic control is not executed. The fuel injector diagnostic control subsequently determines whether the enable conditions are met. Exemplary enable conditions include, but are not limited to, engine coolant temperature being at an acceptable level, the transmission being in park or neutral, sufficient fuel supply in the fuel reservoir 32 and/or the battery voltage being at a sufficient level.

If the enable conditions are met, the fuel injector diagnostic control activates the fuel pump 38 and disables the ignition system 36 and fuel injectors 22. The high pressure fuel pump/pressure control 34 is commanded to provide a maximum rail pressure ($P_{RAILMAX}$) and the fuel injector diagnostic control cranks the engine. Rotation of the engine causes the high pressure fuel pump to build fuel pressure in the fuel rail. The fuel pressure ($P_{FUEL}$) within the fuel rail is monitored with the pressure sensor 42 and it is determined whether $P_{FUEL}$ achieves a threshold fuel pressure ($P_{FUELTHR}$). If $P_{FUEL}$ achieves $P_{FUELTHR}$, engine cranking is discontinued. If $P_{FUEL}$ does not achieve $P_{FUELTHR}$ within a timed out period ($t_{TO}$) the fuel injector diagnostic control aborts.

Upon discontinuation of the engine cranking, the fuel pump 38 is disabled when the engine speed ($RPM_{ENG}$) is at or near 0 RPM. $P_{FUEL}$ is monitored with the pressure sensor 42 and the fuel injector diagnostic control determines whether $P_{FUEL}$ has stabilized. This can be achieved by monitoring the rate of change of $P_{FUEL}$. If the rate of change of $P_{FUEL}$ is less than a threshold rate of change, $P_{FUEL}$ is deemed to have stabilized. If $P_{FUEL}$ has not stabilized, the fuel injector diagnostic control determines whether $P_{FUEL}$ is dropping excessively. $P_{FUEL}$ is deemed to be dropping excessively if the rate of change of $P_{FUEL}$ is greater then an excessive rate of change threshold.

Once $P_{FUEL}$ has stabilized, the fuel injector diagnostic control records a pre-pulse fuel pressure ($P_{FUELPRE}$) and pulses the fuel injector associated with a single cylinder (CYL). After pulsing of the fuel injector, the fuel injector diagnostic control determines whether $P_{FUEL}$ has again stabilized. Once $P_{FUEL}$ has stabilized, the fuel injector diagnostic control records a post-pulse fuel pressure ($P_{FUELPOST}$). A fuel pressure differential (ΔP) is determined for the particular cylinder as the difference between $P_{FUELPRE}$ and $P_{FUELPOST}$. The fuel injector diagnostic control is executed for each cylinder selected by the operator to provide a ΔP value for all of the cylinders.

The ΔP values are available for a technician to review. Each value can be compared to a pressure differential range that is defined between a minimum ΔP value and a maximum ΔP value. If the ΔP value for a particular cylinder is less than the minimum ΔP values or is greater than the maximum ΔP value, the ΔP value for the particular cylinder is deemed not to be within the pressure differential range.

Figure 2A:
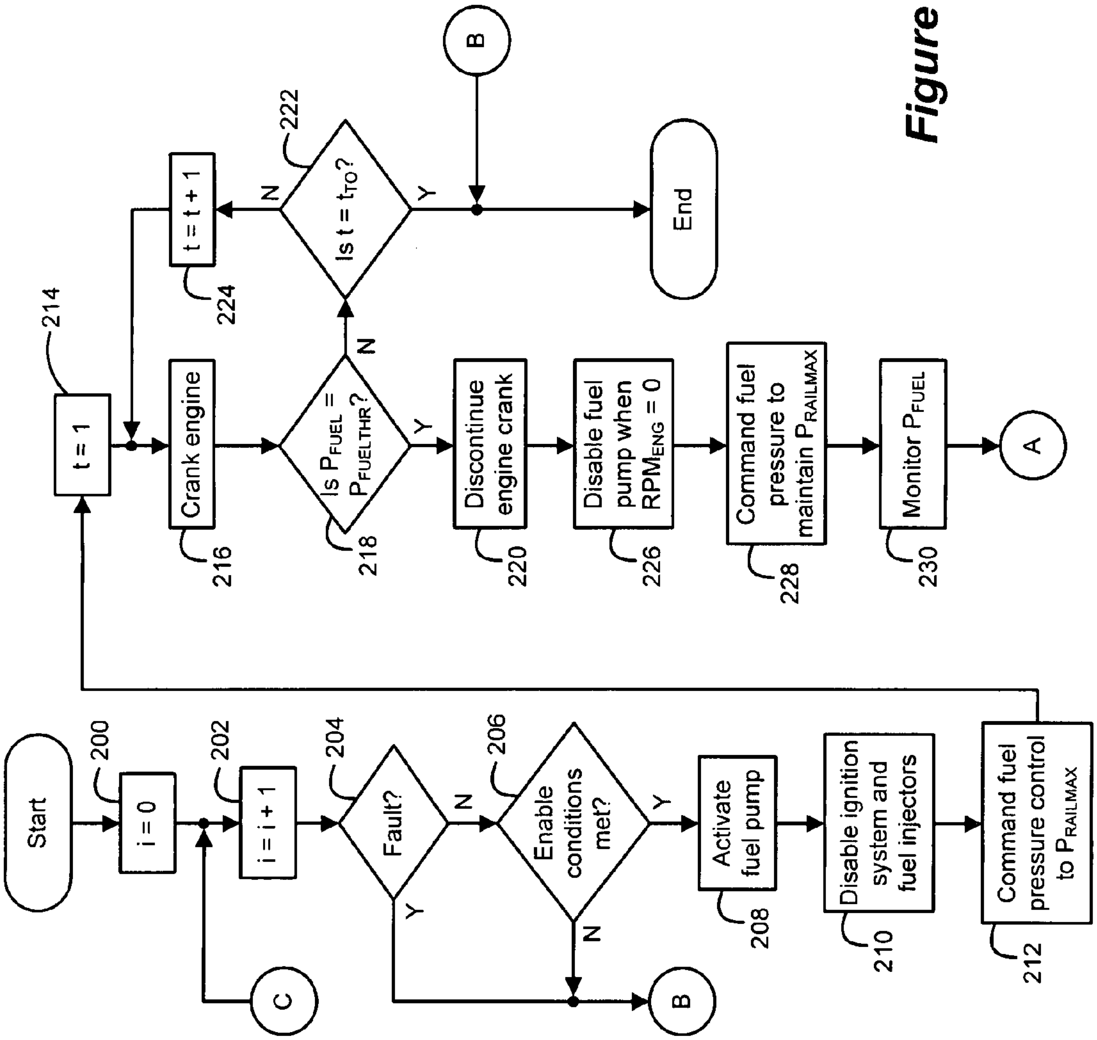
FIGS. 2A-2B illustrate a flowchart illustrating exemplary steps executed by the fuel injector diagnostic control of the present disclosure.
Figure 2B:
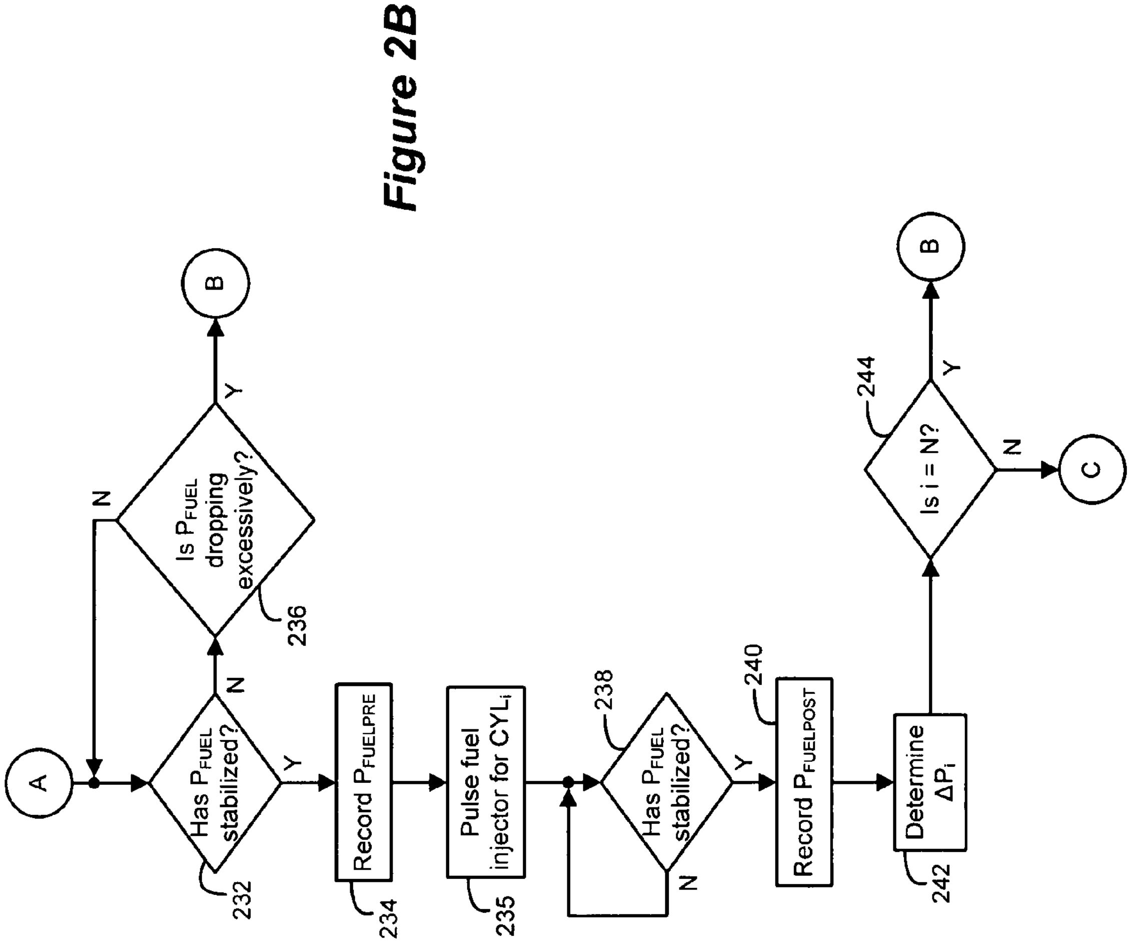

Referring now to FIGS. 2A-2B, exemplary steps that are executed by the fuel injector diagnostic control will be described in detail. In step 200 control sets a counter i equal to 0. In step 202, control increments i. Control identifies whether any faults are indicated which would affect the test in step 204. If there are no faults, control continues in step 206. If one or more faults are present, control ends. In step 206, control determines whether the enable conditions are met. If the enable conditions are met, control continues in step 208.

Control activates the fuel pump in step 208 and disables the ignition system and fuel injectors in step 210. In step 212, control commands the fuel pressure control to $_{PRAILMAX}$. Control sets a timer t equal to 1 in step 214. In step 216, control cranks the engine. Control determines whether $P_{FUEL}$ is equal to $P_{FUELTHR}$ in step 218. If $P_{FUEL}$ is equal to $P_{FUELTHR}$, control continues in step 220. If $P_{FUEL}$ is not equal to $P_{FUELTHR}$, control continues in step 222. In step 222, control determines whether t is equal to $t_{TO}$. If t is equal to $t_{TO}$, control ends. If t is not equal to $t_{TO}$, control increments t in step 224 and loops back to step 216.

In step 220, control discontinues the engine cranking. Control disables the fuel pump when $RPM_{ENG}$ is at or near 0 RPM in step 226. In step 228, control commands the fuel pressure control to maintain $P_{RAILMAX}$. In step 230, control monitors $P_{FUEL}$ . Control determines whether $P_{FUEL}$ has stabilized in step 232. If $P_{FUEL}$ has stabilized, control continues in step 234. If $P_{FUEL}$ has not stabilized, control continues in step 236. In step 236, control determines whether $P_{FUEL}$ is dropping excessively. If $P_{FUEL}$ is not dropping excessively, control loops back to step 232. If $P_{FUEL}$ is dropping excessively, control ends.

In step 234, control records the fuel pressure $P_{FUELPRE}$. In step 235, control pulses the fuel injector for $CYL_i$. In step 238, control determines whether $P_{FUEL}$ has stabilized. If $P_{FUEL}$ has stabilized, control continues in step 240. If $P_{FUEL}$ has not stabilized, control loops back to step 238. In step 240, control records $P_{FUELPOST}$. Control determines $ΔP_i$ in step 242. In step 244, control determines whether i is equal to N. If i is equal to N, control ends. If i is not equal to N, control loops back to step 202.

In an alternative embodiment, the test ends after testing a single cylinder and only continues when the technician selects another cylinder to test. In this alternative embodiment, the test does not automatically run through every cylinder in the engine. Further, it is anticipated that the test prevents testing of the same cylinder twice without starting the engine. This prevents washing down a cylinder or hydraulic locking. The Δ pressure is recorded in a PID or DID and is available for the technician to view.

Figure 3:
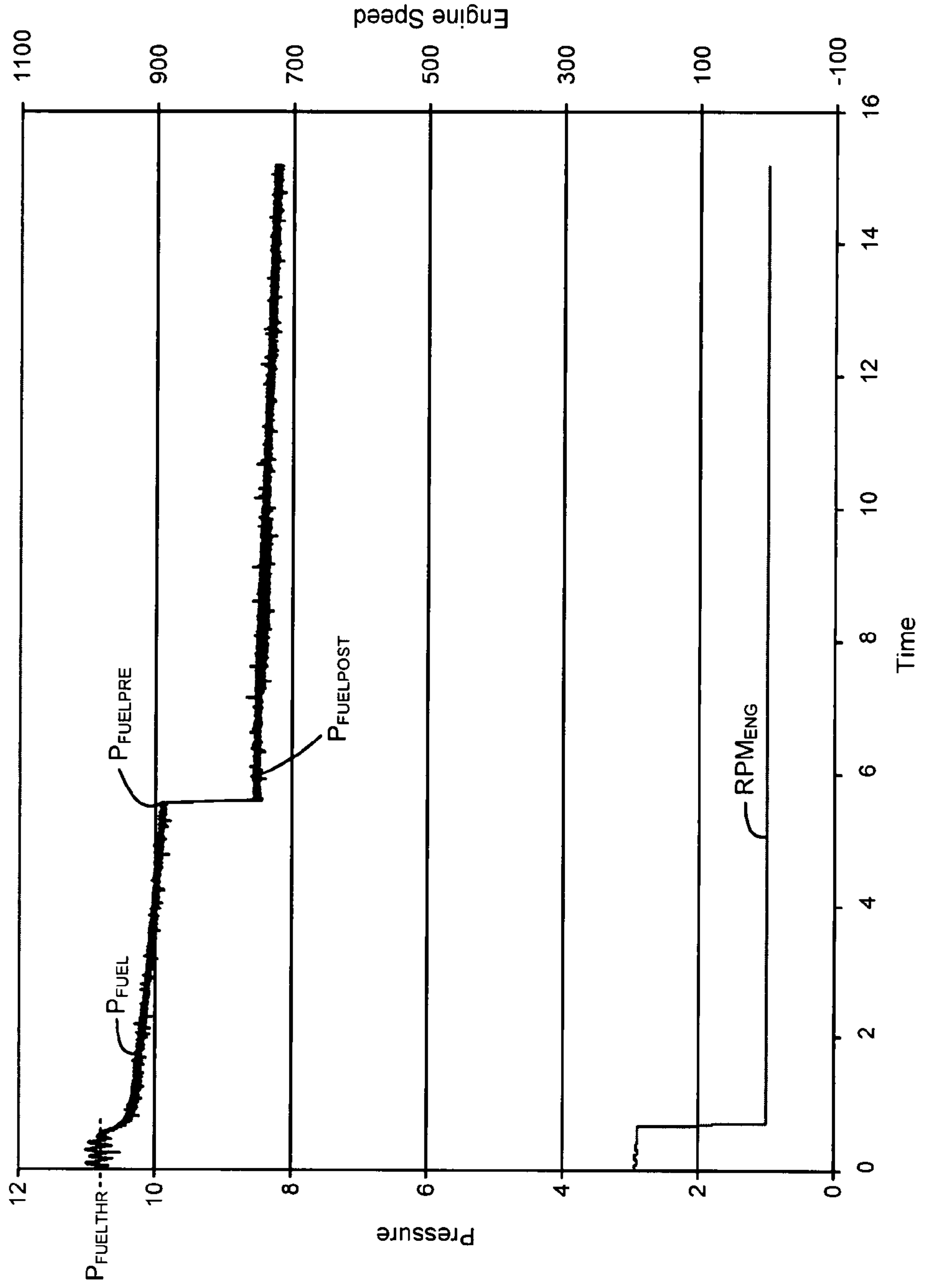
FIG. 3 is a graph illustrating an exemplary fuel pressure trace in accordance with the fuel injector diagnostic control.

Referring now to FIG. 3, an exemplary graph illustrates $P_{FUEL}$ and $RPM_{ENG}$ traces during execution of the fuel injector diagnostic control. Once the engine cranking is discontinued, $P_{FUEL}$ is monitored until $P_{FUELPRE}$ is determined after $P_{FUEL}$ has stabilized. The particular fuel injector is pulsed and $P_{FUEL}$ is again monitored. Once $P_{FUEL}$ has stabilized, $P_{FUELPOST}$ is determined and ΔP is calculated based on $P_{FUELPRE}$ and $P_{FUELPOST}$.

Figure 4:
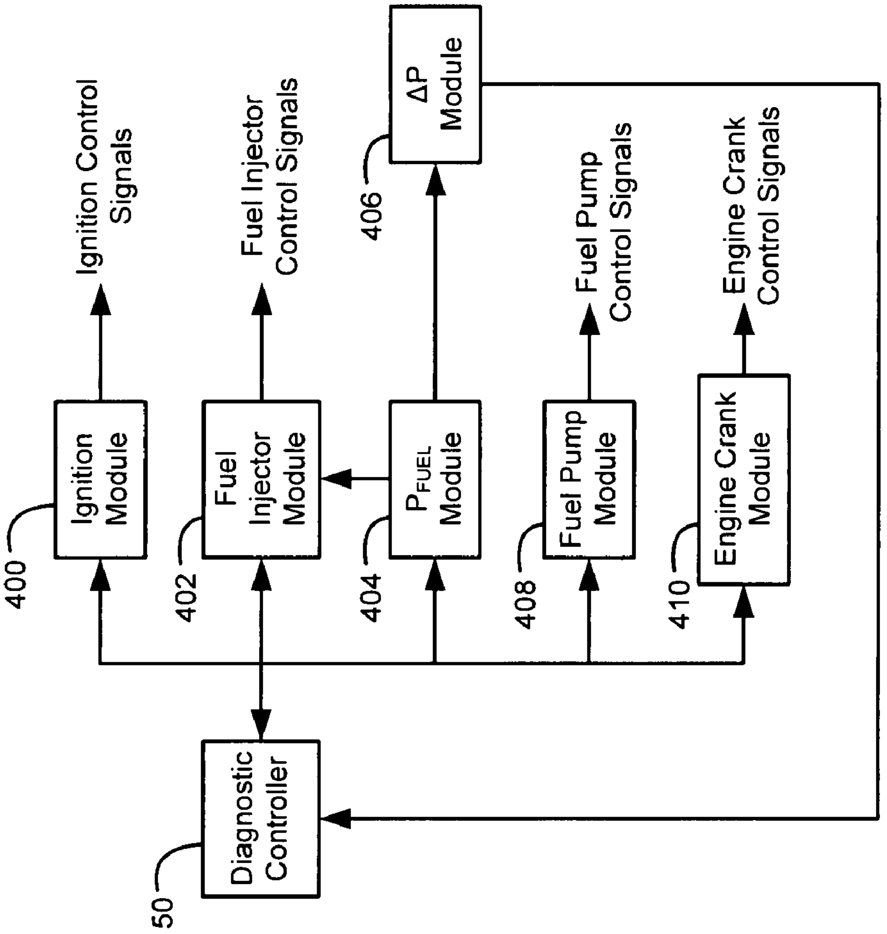
FIG. 4 is a functional block diagram of exemplary modules that execute the fuel injector diagnostic control of the present disclosure.

Referring now to FIG. 4, exemplary modules that execute the fuel injector diagnostic control will be described in detail. The exemplary modules include the diagnostic controller 50, an ignition module 400, a fuel injector module 402, a $P_{FUEL}$ module 404, a ΔP module 406, a fuel pump module 408 and an engine crank module 410. The ignition module 400 selectively inhibits ignition of the engine and the $P_{FUEL}$ module 404 monitors the fuel pressure within the fuel rail of the engine.

The fuel injector module 402 selectively pulses a fuel injector of the plurality of fuel injectors of the engine. The $P_{FUEL}$ module 404 determines whether the fuel pressure has stabilized and the fuel injector module pulses the fuel injector when the fuel pressure has stabilized. The ΔP module 406 calculates a pressure differential based on a pre-pulse fuel pressure and a post-pulse fuel pressure. The pressure differential can be fed back to the diagnostic controller 50 for a technician to review the results and determine whether the fuel injector is operating properly based on the pressure differential.

The fuel pump module 408 operates the fuel pump in order to provide fuel to the high pressure fuel pump. The engine crank module 410 cranks the engine until the fuel pressure achieves the threshold fuel pressure prior to pulsing of the fuel injector, as described in detail above. The fuel pump module 408 discontinues operation of the fuel pump-when the engine speed is zero-after having cranked the engine.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of testing the operation of each of a plurality of fuel injectors of an internal combustion engine system, comprising:
- inhibiting ignition of the engine;
- monitoring a fuel pressure within a fuel rail of the engine;
- pulsing a fuel injector of the plurality of fuel injectors of the engine;
- determining whether said fuel pressure has stabilized;
- calculating a pressure differential based on a pre-pulse fuel pressure and a post-pulse fuel pressure when said fuel pressure has stabilized; and
- determining whether said fuel injector is operating properly based on said pressure differential.

2. The method of claim 1 further comprising operating a fuel pump in order to provide fuel to a high pressure fuel pump.

3. The method of claim 2 further comprising cranking the engine until said fuel pressure achieves a threshold fuel pressure.

4. The method of claim 2 further comprising discontinuing operation of said fuel pump when an engine speed is zero after having cranked the engine.

5. The method of claim 2 further comprising aborting the testing if said fuel pressure does not achieve a threshold fuel pressure within a threshold time period.

6. The method of claim 1 further comprising identifying whether a fault condition of a component of the engine exists.

7. The method of claim 1 further comprising determining whether enable conditions are met.

8. A fuel injector diagnostic system for testing the operation of each of a plurality of fuel injectors of an internal combustion engine system, comprising:
- a first module that inhibits ignition of the engine;
- a second module that monitors a fuel pressure within a fuel rail of the engine;
- a third module that pulses a fuel injector of the plurality of fuel injectors of the engine, wherein said second module determines whether said fuel pressure has stabilized;
- a fourth module that calculates a pressure differential based on a pre-pulse fuel pressure and a post-pulse fuel pressure when said fuel pressure has stabilized; and
- a fifth module that determines whether said fuel injector is operating properly based on said pressure differential.

9. The fuel injector diagnostic system of claim 8 further comprising a sixth module that operates a fuel pump in order to provide fuel to a high pressure fuel pump.

10. The fuel injector diagnostic system of claim 9 further comprising a seventh module that cranks the engine until said fuel pressure achieves a threshold fuel pressure.

11. The fuel injector diagnostic system of claim 9 wherein said sixth module discontinues operation of said fuel pump when an engine speed is zero after having cranked the engine.

12. The fuel injector diagnostic system of claim 9 wherein the testing is aborted if said fuel pressure does not achieve a threshold fuel pressure within a threshold time period.

13. The fuel injector diagnostic system of claim 8 further comprising a sixth module that identifies whether a fault condition of a component of the engine exists.

14. The fuel injector diagnostic system of claim 8 further comprising a sixth module that determines whether enable conditions are met.

15. A method of testing the operation of each of a plurality of fuel injectors of an internal combustion engine system, comprising:
- coupling a diagnostic controller to a control module of a vehicle;
- initiating a fuel injector test using said diagnostic controller, wherein said fuel injector test comprises:
  - inhibiting ignition of the engine;
  - monitoring a fuel pressure within a fuel rail of the engine;
  - pulsing a fuel injector of the plurality of fuel injectors of the engine;
  - determining whether said fuel pressure has stabilized;
  - calculating a pressure differential based on a pre-pulse fuel pressure and a post-pulse fuel pressure when said fuel pressure has stabilized; and
  - determining whether said fuel injector is operating properly based on said pressure differential.

16. The method of claim 15 further comprising operating a fuel pump in order to provide fuel to a high pressure fuel pump.

17. The method of claim 16 further comprising cranking the engine until said fuel pressure achieves a threshold fuel pressure.

18. The method of claim 16 further comprising discontinuing operation of said fuel pump when an engine speed is zero after having cranked the engine.

19. The method of claim 16 further comprising aborting the testing if said fuel pressure does not achieve a threshold fuel pressure within a threshold time period.

20. The method of claim 15 further comprising identifying whether a fault condition of a component of the engine exists.

21. The method of claim 15 further comprising determining whether enable conditions are met.

* * * * *